United States Patent
Kurosaka et al.

(10) Patent No.: US 11,729,229 B2
(45) Date of Patent: Aug. 15, 2023

(54) INFORMATION PROCESSING SYSTEM, SERVER DEVICE, AND COMPUTER PROGRAM PRODUCT

(71) Applicant: KABUSHIKI KAISHA TOSHIBA, Tokyo (JP)

(72) Inventors: Takumi Kurosaka, Kawasaki Kanagawa (JP); Tetsuro Kimura, Tama Tokyo (JP); Masanori Furuta, Odawara Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/898,161

(22) Filed: Aug. 29, 2022

(65) Prior Publication Data

US 2023/0199047 A1   Jun. 22, 2023

(30) Foreign Application Priority Data

Dec. 17, 2021   (JP) .................. 2021-205437

(51) Int. Cl.
*H04L 65/60*   (2022.01)
(52) U.S. Cl.
CPC .................. *H04L 65/60* (2013.01)
(58) Field of Classification Search
CPC ....................................... H04L 65/60
See application file for complete search history.

(56) References Cited

U.S. PATENT DOCUMENTS

| 10,900,084 B2 | 1/2021 | Goto et al. |
| 10,990,084 B2 | 4/2021 | Nishiyama et al. |
| 2019/0383701 A1 | 12/2019 | Tezuka |

FOREIGN PATENT DOCUMENTS

| JP | 2018-151918 A | 9/2018 |
| JP | 2019-219725 A | 12/2019 |

*Primary Examiner* — Bryan Y Lee
(74) *Attorney, Agent, or Firm* — Finnegan, Henderson, Farabow, Garrett & Dunner, LLP

(57) ABSTRACT

An information processing system includes a server device and one or more edge systems. The server device includes a memory, and one or more processors coupled to the memory and configured to: receive a plurality of first stream data to which first time information is associated from the edge systems; receive reference information in which second time information and the first time information corresponding to the selected first stream data are associated to each other, from the edge systems; receive an acquisition request of the first stream data corresponding to third time information expressed in the same format as the second time information; and identify the first stream data to which the first time information corresponding to the third time information is associated based on the reference information.

13 Claims, 15 Drawing Sheets

FIG.2

| IDENTIFICATION INFORMATION | TIME INFORMATION TA | TIME INFORMATION TB |
|---|---|---|
| ID001 | 10000 | 20211201 12:00:00 |
| ID001 | 11440 | 20211201 12:01:00 |
| ⋮ | ⋮ | ⋮ |

FIG.6

| IDENTIFICATION INFORMATION | TIME INFORMATION $TA_1$ | TIME INFORMATION $TA_2$ | TIME INFORMATION TB |
|---|---|---|---|
| ID001 | 10000 | 20005 | 20211201 12:00:00 |
| ID001 | 11440 | 21405 | 20211201 12:01:00 |
| ⋮ | ⋮ | ⋮ | ⋮ |

FIG.13

| IDENTIFICATION INFORMATION | TIME INFORMATION TA | TIME INFORMATION TB |
|---|---|---|
| ID001 | 10000 | 20211201 12:00:00 |
| ID001 | 11000 | 20211201 12:00:00 |
| ID001 | 12000 | 20211201 12:01:00 |
| ⋮ | ⋮ | ⋮ |

FIG.14

| IDENTIFICATION INFORMATION | TIME INFORMATION $TA_1$ | TIME INFORMATION $TA_2$ | TIME INFORMATION TB |
|---|---|---|---|
| ID001 | 10000 | 20211201 12:00:00 | 20211201 12:00:00 |
| ID001 | 11000 | 20211201 12:00:00 | 20211201 12:00:30 |
| ID001 | 12000 | 20211201 12:01:00 | 20211201 12:01:00 |
| ⋮ | ⋮ | ⋮ | ⋮ |

INFORMATION PROCESSING SYSTEM, SERVER DEVICE, AND COMPUTER PROGRAM PRODUCT

CROSS-REFERENCE TO RELATED APPLICATIONS

This application is based upon and claims the benefit of priority from Japanese Patent Application No. 2021-205437, filed on Dec. 17, 2021; the entire contents of which are incorporated herein by reference.

FIELD

Embodiments described herein relate generally to an information processing system, a server device, and a computer program product.

BACKGROUND

Recently, in cloud services that collect and distribute videos, there has been an increasing demand for improvement in the function of data processing along with its sophistication, in such a case of playing back a video from a certain point in the past as indicated by time-series data, or cutting out a video from a certain point in the past and saving it in a file. The time-series data is, for example, detection data by a temperature sensor. Time information indicating, for example, detected timings (e.g., year, month, date, hour, minute, second) is associated to the time-series data. Time information indicating, for example, playback timings (e.g., frame numbers) is similarly associated to stream data of video (video stream data).

To satisfy such a demand, a mechanism that links the time information of the time-series data with the time information of the video stream data, and enables the cloud services to identify which time information of the video stream data corresponds to a desired playback position is necessary.

BRIEF DESCRIPTION OF THE DRAWINGS

FIG. 2 is a diagram illustrating a data structure example of reference information;
FIG. 6 is a diagram illustrating a data structure example of reference information of the first modification;
FIG. 13 is a diagram illustrating a data structure example of reference information of a first modification of the second embodiment;
FIG. 14 is a diagram illustrating a data structure example of reference information of a second modification of the second embodiment.

DETAILED DESCRIPTION

Figure 1:
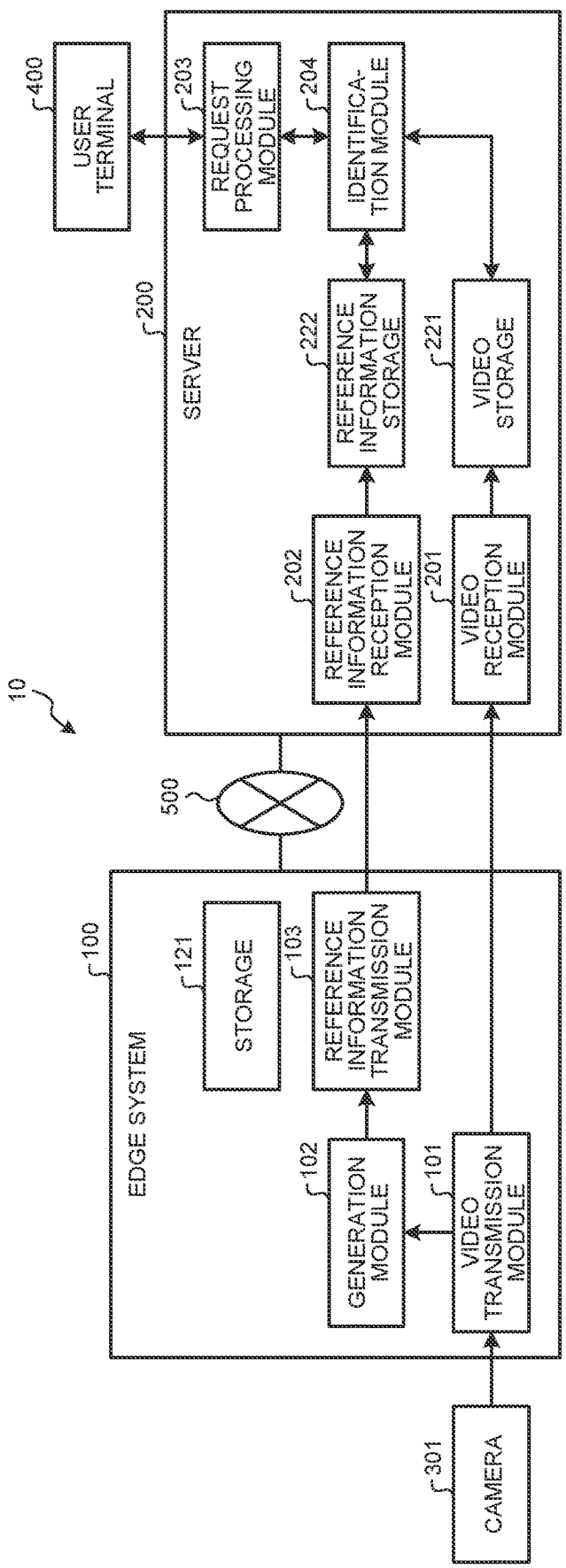
FIG. 1 is a block diagram of an information processing system according to a first embodiment.

According to an embodiment, an information processing system includes a server device and one or more edge systems. The server device includes a memory, and one or more processors coupled to the memory and configured to: receive a plurality of first stream data to which first time information is associated from the edge systems; receive reference information in which second time information and the first time information corresponding to the selected first stream data are associated to each other, from the edge systems; receive an acquisition request of the first stream data corresponding to third time information expressed in the same format as the second time information; and identify the first stream data to which the first time information corresponding to the third time information is associated based on the reference information.

Hereinafter, preferred embodiments of an information processing system, a server device, and a computer program product according to the present disclosure will be described in detail with reference to the accompanying drawings.

In the following, an example of processing stream data that can be identified by time information indicating timings will be described. The stream data is data that is outputted over time, for example. The stream data includes time-series data, which is a series of data generated at regular intervals and including information indicating generated times, for example.

The stream data can be any data. For example, the stream data is detection data output by a sensor (detection device) that detects a predetermined physical quantity at regular intervals. The sensor is, for example, the following devices, but may be any other type of device:
Camera (imaging device)
Microphone (sound collection device)
Temperature sensor
Humidity sensor
Radio wave sensor
Sensor to measure motor speed, voltage, power, etc.

Examples of the stream data generated by such a sensor include video stream data, audio stream data, and waveform data showing changes in detection results.

The time information may be in any format that allows for the identification of a timing (temporal position) of the stream data. For example, the time information is expressed in the following formats:

(T1) An absolute time expressed based on a prescribed time: a time according to the ISO (International Organization for Standardization) 8601 standard, Unix time, etc.

(T2) A relative time expressed based on a freely definable timing: a frame number of the video stream data, a time based on start timing of a predetermined processing or function, a data amount, a data position, etc.

The data position is a position with a special meaning, such as the first byte or the 1001st byte. The data position may be a position with a specific meaning, such as before or after data (or a frame) that separates data, expressed in a specific data format, such as H.264 start code.

The time information may be in a numerical value format that expresses time according to a predetermined format, such as a timestamp, based on the state of a device's internal clock or the like, or may be in a text format that expresses time.

As a technique for identifying the stream data, two techniques have been proposed: one for embedding a timestamp in the stream data to be identified, and the other for controlling the processing of the stream data using a timing indicated by a specific counter.

However, in order to apply these techniques to a system that handles stream data having no timestamp nor other time information, it is necessary to modify a data format, a processing procedure, and the like specified by a communication protocol used in the system so that the system can handle the time information. There are two major protocol modifications. One is to modify the specification of the existing protocol itself to create a new proprietary protocol. The other is to use optional portions of the existing protocol (a data format or processing that can be optionally added by a user or an application). In either case, the entire end-to-end system, from an edge system (edge device) that generates the stream data to a cloud server (server device that provides a cloud service), needs to support the modified protocol.

However, it is difficult to modify all the computer programs of the system. Particularly, when stream data with a sampling rate of several hundred kHz or higher, such as waveform data, is handled, it is difficult to implement a modification that adds the time information such as timestamps to samples of the stream data or a modification that changes processing timings of the stream data, because of an increase in the amount of data to be handled and processing load.

Therefore, in the following embodiments, the edge system transmits reference information used to identify the stream data to the server, independently of the transmission of the stream data. The reference information is information in which the time information (e.g., a frame number) of the stream data as a reference, and the time information (e.g., a timestamp) in a format used to identify the stream data are associated to each other. When receiving a request to acquire the stream data from a user, the server identifies a temporal position of the requested stream data by referring to the reference information and returns the identified result to the user. This allows for more efficient identification of the desired stream data.

As described above, the reference information is generated, transmitted, and stored independently of the function of processing the stream data. Thus, when the embodiments described herein are applied to an existing system, the entire end-to-end modification of the existing system is not required. It may be necessary to modify computer programs on the edge system side in the existing system to generate the time information of the stream data. Even in such a case, it is not necessary to modify computer programs on the cloud server side that collects the stream data.

The reference information only needs to be generated at a granularity larger than the stream data (e.g., one sample per second) to a degree as desired by a user. Thus, it is not necessary to generate the reference information for all the samples, even when the stream data with a sampling rate of several hundred kHz or higher is handled. In other words, the amount of data and processing load can be reduced.

Therefore, the system capable of more efficiently identifying the desired stream data can be easily implemented while satisfying user needs.

First Embodiment

FIG. 1 is a block diagram illustrating a configuration example of an information processing system 10 according to a first embodiment. As illustrated in FIG. 1, the information processing system 10 includes an edge system 100 and a server 200 (an example of a server device), connected by a network 500.

The network 500 is, for example, the Internet and a local area network (LAN), but not limited to these networks. The network 500 may be any one of a wired network, a wireless network, and a mixed wired and wireless network.

The server 200 is connected to a user terminal 400 used by a user who requests stream data, for example, via the network 500. A plurality of the user terminals 400 may be connected to the server 200. The user terminal 400 is, for example, a personal computer, and a portable terminal.

The edge system 100 is connected to a camera 301 that generates video stream data. The video stream data is an example of a plurality of stream data (first stream data) to which time information (first time information) is associated. The time information is, for example, a frame number. The edge system 100 and the camera 301 are connected via, for example, a control bus or the network 500. The camera 301 may be provided inside the edge system 100.

The server 200 may be configured by a single physical piece of hardware or may be built as a cloud server in a cloud environment. The edge system 100 is configured by a single physical piece of hardware, for example. An example where the edge system is configured by a plurality of physical pieces of hardware (devices) will be described in a third embodiment.

Although only one edge system 100 and one user terminal 400 are illustrated in FIG. 1, the information processing system 10 may include a plurality of the edge systems 100 and a plurality of the user terminals 400. A plurality of the cameras 301 may also be provided, as described later in the modifications below.

The edge system 100 includes a video transmission module 101 (an example of a first data transmission module), a generation module 102, a reference information transmission module 103, and a storage 121.

The video transmission module 101 encodes the video stream data received from the camera 301 and transmits the encoded video stream data to the server 200. The video transmission module 101 transmits the video stream data to the server 200 while storing the operating status of the video transmission module 101 in the storage 121 or the like as needed.

The operating status is the status of operations involved in encoding and transmitting the video stream data. The operating status includes at least the time information of the video stream data. The time information included in the operating status is, for example, the frame number of the most recently transmitted video stream data and the elapsed time since the start of operation of the video transmission module 101. The operating status is referred to when the generation module 102 generates reference information.

Functions equivalent to the video transmission module 101, and a video reception module 201 and a video storage 221 of the server 200, which will be described later, can be interpreted as being equivalent to a system that collects stream data. If an existing system is to be applied to this system, and a component of the existing system equivalent to the video transmission module 101 does not have a function to store the operating status, the modification may be required to add this function. On the other hand, even in this case, the server 200 does not require any modification such as adding functions.

The generation module 102 generates reference information when a condition for generating reference information (generation condition) is met.

The reference information is information in which the time information corresponding to the video stream data selected as a reference from the plurality of video stream data and time information (second time information) having a different generation source from the time information of the video stream data are associated to each other. The time information of the video stream data is hereinafter referred to as time information TA. The time information having a different generation source from the time information of the video stream data is hereinafter referred to as time information TB.

The time information TA and the time information TB can be any time information as long as their generation sources differ from each other. The time information TA and the time information TB may be in different formats (data formats, display formats) or the same format as each other. In the following, a case where the time information TA is a frame number, which is an example of a relative time, and the time information TB is an absolute time will be described as an example. In other words, an example of a case where the time information TA and the time information TB are in different formats will be described.

As described above, even if the time information TA and the time information TB are in the same format, the same procedure can be applied as long as their generation sources are different. For example, the time information TA obtained from an internal clock of a temperature sensor as the generation source and the time information TB obtained from an internal clock of the edge system 100 as the generation source, which are expressed in the same format (data format), may not be synchronized. The present embodiment allows for the identification of data having a desired timing by associating to each other the two pieces of time information in the same format, but not synchronized as described above.

The time information TA is obtained, for example, from the time information included in the operating status stored by the video transmission module 101. When the frame number of the most recently transmitted video stream data is stored as the time information, the video stream data most recently transmitted by the video transmission module 101 is the video stream data selected as a reference. The time information TB is obtained, for example, from the internal clock of the edge system 100.

The condition for generating the reference information is, for example, as follows:
To generate the reference information every time a certain period of time elapses (e.g., once per second, once per minute).
To generate the reference information when receiving a control instruction from inside or outside the edge system 100.

For example, the control instruction may be output by the video transmission module 101 each time the transmission of one frame of video stream data is completed, or each time the transmission of a specific frame in the video stream data is completed. Examples of the "specific frame in the video stream data" include a key frame (encoded data that can be decoded independently in the video stream data), and a frame (first frame) corresponding to the beginning of a frame count (frame numbers within a second, which make one round in a second).

The generation module 102 generates the reference information at a timing when the generation condition is met. The generation module 102 may also perform calibration based on the measurement of a delay time or the like for internal processing, and correct the time information used as the reference information. The calibration may be performed only once after the edge system 100 is started, or may be performed regularly after the edge system 100 is started. The generation module 102 transmits the generated reference information to the reference information transmission module 103.

The reference information transmission module 103 transmits the reference information received from the generation module 102 to the server 200. If an abnormality occurs during the generation or transmission of the reference information, the generation process of the reference information by the generation module 102 or the transmission process of the reference information by the reference information transmission module 103 may be performed again, or the stream data with the abnormality may be discarded.

The above units (the video transmission module 101, the generation module 102, and the reference information transmission module 103) are achieved by using, for example, one or more processors. For example, the above units may be achieved by causing a processor such as a central processing unit (CPU) to execute computer programs, i.e., by software. The above units may be achieved by using a processor such as a dedicated integrated circuit (IC), i.e., by hardware. The above units may be achieved using a combination of software and hardware. When a plurality of processors are used, each processor may achieve a corresponding one of the units or corresponding two or more of the units.

The storage 121 stores various data used in various processes of the edge system 100. For example, the storage 121 functions as a buffer for allowing the video transmission module 101 to store the operating status (time information). When a buffer is included in the video transmission module 101, the storage 121 does not have to be provided.

The storage 121 can be configured by any commonly used storage medium such as a flash memory, a memory card, a random access memory (RAM), a hard disk drive (HDD), and an optical disk.

The server 200 includes the video reception module 201 (an example of a data reception module), a reference information reception module 202, a request processing module 203, an identification module 204, the video storage 221 (an example of a data storage), and a reference information storage 222.

The video reception module 201 receives the video stream data from the edge system 100 and stores the received video stream data in the video storage 221. The video reception module 201 may perform pre-processing, such as converting the video stream data to a format to be stored in the video storage 221. Examples of the pre-processing include file format conversion of the video stream data and transcoding of the video stream data.

The video storage 221 stores the video stream data received from the edge system 100.

The reference information reception module 202 receives the reference information transmitted by the edge system 100 and stores the received reference information in the reference information storage 222.

The reference information storage 222 stores (accumulates) the reference information received from the edge system 100. FIG. 2 is a diagram illustrating a data structure example of the reference information stored in the reference information storage 222. As illustrated in FIG. 2, the reference information includes identification information, the time information TA, and the time information TB. The identification information is, for example, information identifying the edge system 100 that transmitted the reference information. For the information processing system 10 including one edge system 100, for example, the reference information does not need to include the identification information.

Returning to FIG. 1, the request processing module 203 receives an acquisition request received from a user and an application, and transmits a response to the acquisition request. For example, the request processing module 203 receives an acquisition request requesting identification of the video stream data, including specifying of time information (an example of third time information; hereinafter referred to as time information TC) expressed in the same format as the time information TB, from the user terminal 400 or the like. Upon receiving the acquisition request, the request processing module 203 instructs the identification module 204 to identify the video stream data corresponding to the time information TC included in the acquisition request.

The request processing module 203 also transmits information indicating the video stream data identified by the identification module 204 as the data corresponding to the time information TC (e.g., the video stream data itself, or the identification information of the video stream data) to the transmission source of the acquisition request as the response to the acquisition request.

The identification module 204 performs an identification process to identify the video stream data corresponding to the time information TC included in the acquisition request. For example, the identification module 204 identifies the video stream data to which the time information TB corresponding to the time information TC included in the acquisition request is associated, by referring to the reference information stored in the reference information storage 222.

The time information TB corresponding to the time information TC may be the time information TB that matches the time information TC, or the time information TB having a smaller difference from the time information TC than other pieces of the time information (for example, the time information TB with a smallest difference).

The identification module 204 may obtain the time information TB having a smaller difference from the time information TC than other pieces of the time information, and identify the video stream data corresponding to a time that is shifted by an amount equivalent to the difference between the time information TB and the time information TC. At this time, the identification module 204 may identify the video stream data by referring to parameters, meta-information, or the like added to the video stream data stored in the video storage 221.

For example, when a frame rate is added to the video stream data, the identification module 204 uses the frame rate (e.g., FPS: frames per second) to calculate the number of frames within a fixed time (e.g., one second). The identification module 204 calculates the number of frames equivalent to the difference between the time information TB and the time information TC. The identification module 204 identifies the video stream data corresponding to a time that is shifted by the calculated number of frames from the obtained time information TB, as the video stream data corresponding to the time information TC.

A specific example of the identification process by the identification module 204 will be described. In the following, a case where the time information TA is a "frame number", the time information TB is an "absolute time of the edge system 100", and the time information TC specified in the acquisition request is an "absolute time of the edge system 100" will be described as an example.

In this case, if any of the reference information stored in the reference information storage 222 includes the time information TB that matches the time information TC (T_req), the identification module 204 outputs a frame number (N_req) corresponding to T_req as the identification result. When the video stream data can be identified by referring only to the reference information stored in the reference information storage 222 as in this example, the identification module 204 does not need to refer to the video stream data or the like in the video storage 221.

The identification result does not have to be the frame number, but may be the video stream data itself. For example, the identification module 204 may read the video stream data including the N_regth frame out of the video stream data stored in the video storage 221 to be output as the identification result. The identification module 204 may output identification information such as a uniform resource locator (URL) to access the video stream data including the N_reqth frame, as the identification result.

If no reference information stored in the reference information storage 222 includes the time information TB that matches the time information TC (T_req), the identification module 204 identifies the video stream data by using the reference information of the time information (T_req') closest to T_req.

For example, the identification module 204 outputs the frame number corresponding to T_req' as the identification result (approximate solution). Similarly to the above, the identification module 204 may output the video stream data itself as the identification result instead of the frame number.

The identification module 204 may generate new video stream data corresponding to the time information TB that matches T_req from the video stream data read from the video storage 221 to be output as the identification result. For example, suppose that video stream data starting from a certain time $T_0$ is stored in the video storage 221, and a request is made to acquire video stream data starting from a time $T_1$ later than the time $T_0$. In this case, the identification module 204 generates new video stream data by deleting frames equivalent to the time $T_0$ to the time $T_1$ from the video stream data starting from the time $T_0$ to be output as the identification result.

The above units (the video reception module 201, the reference information reception module 202, the request processing module 203, and the identification module 204) are achieved by using, for example, one or more processors. For example, the above units may be achieved by causing a processor such as a CPU to execute computer programs, i.e., by software. The above units may be achieved by using a processor such as a dedicated IC, i.e., by hardware. The above units may be achieved using a combination of software and hardware. When a plurality of processors are used, each processor may achieve a corresponding one of the units or corresponding two or more of the units.

The video storage 221 and the reference information storage 222 can be configured with any commonly used storage medium such as a flash memory, a memory card, a RAM, an HDD, and an optical disk. The video storage 221 and the reference information storage 222 may be configured with physically different storage media, or as different storage areas of the physically same storage medium.

Figure 3:
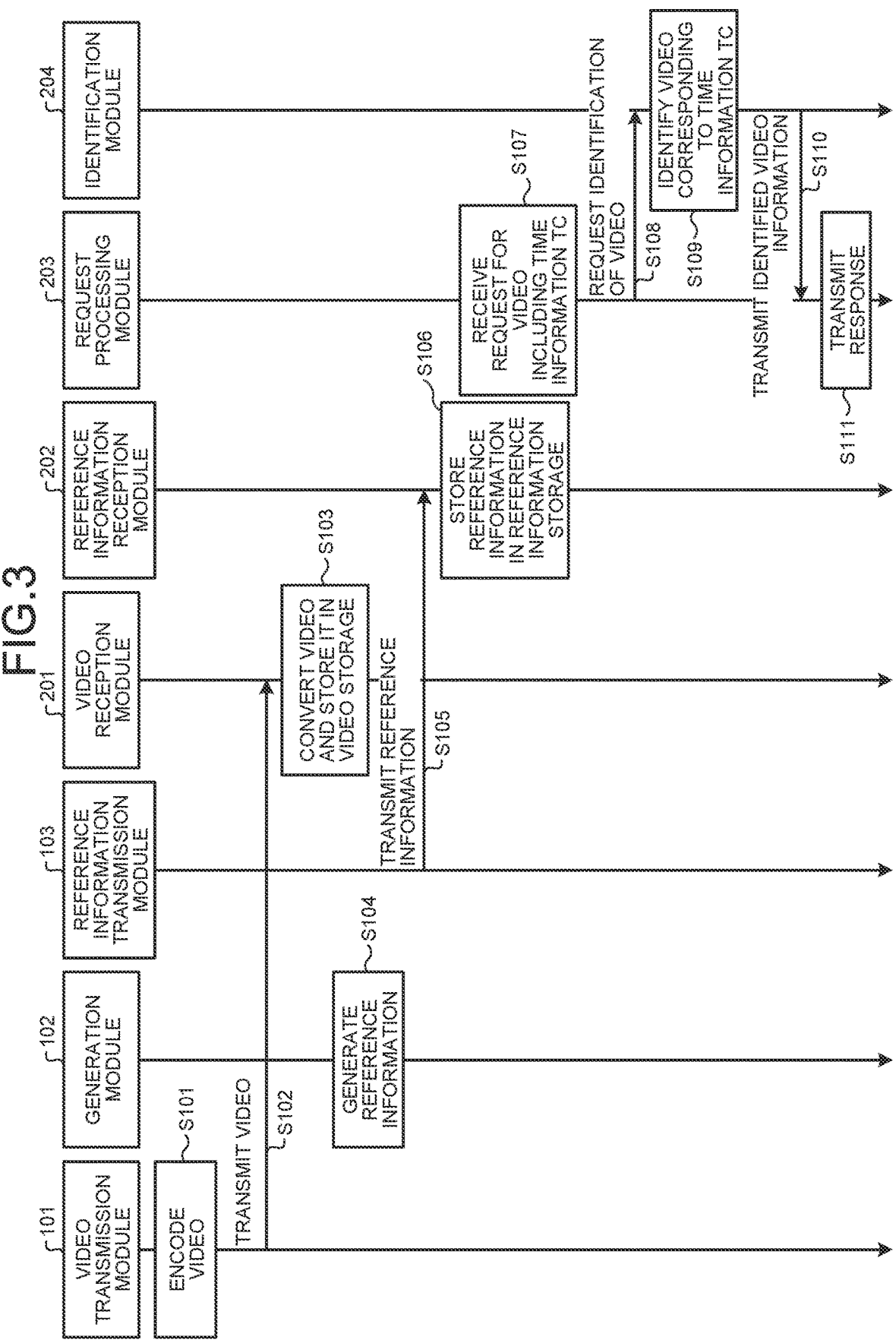
FIG. 3 is a sequence diagram of information processing in the first embodiment.

Next, information processing by the information processing system 10 according to the first embodiment configured as described above will be described. FIG. 3 is a sequence diagram illustrating an example of the information processing in the first embodiment.

The information processing by the information processing system 10 includes three processes: transmitting and storing (accumulating) the video stream data (steps S101 to S103), transmitting and storing (accumulating) the reference information (steps S104 to S106), and identifying the requested video stream data from the stored video stream data (steps S107 to S111). Although these three processes are illustrated consecutively in FIG. 3, each process can be executed independently.

When receiving the video stream data from the camera 301, the video transmission module 101 encodes the received video stream data (step 3101). The video transmission module 101 transmits the encoded video stream data to the server 200 (step S102).

The video reception module 201 of the server 200 converts the video stream data received from the edge system 100 (the video transmission module 101) and stores the converted video stream data in the video storage 221 (step S103).

Meanwhile, the generation module 102 generates the reference information when the generation condition is met (step S104). For example, when the generation condition is defined so as to generate the reference information every time one second elapses, the generation module 102 generates the reference information every second. The reference information transmission module 103 transmits the generated reference information to the server 200 (step S105).

The reference information reception module 202 of the server 200 stores the reference information received from the edge system 100 (the reference information transmission module 103) in the reference information storage 222 (step S106).

Through the above processes, the video stream data and the reference information corresponding to the video stream data are stored (accumulated) in the server 200. The acquisition of the stored video stream data can be requested by specifying the time information TC in the same format as the time information (the time information TB) used in the reference information.

For example, when an acquisition request for the video stream data including the time information TC is transmitted from the user terminal 400, the request processing module 203 of the server 200 receives the acquisition request (step S107). The request processing module 203 requests the identification module 204 to identify the acquisition-requested video stream data (step S108).

The identification module 204 identifies the video stream data corresponding to the time information TC included in the acquisition request by referring to the reference information or the like stored in the reference information storage 222 (step S109). The identification module 204 transmits the information indicating the identified video stream data to the request processing module 203 (step S110). The request processing module 203 transmits the response including the information indicating the video stream data to the user terminal 400, which is the transmission source of the acquisition request (step S111).

Figure 4:
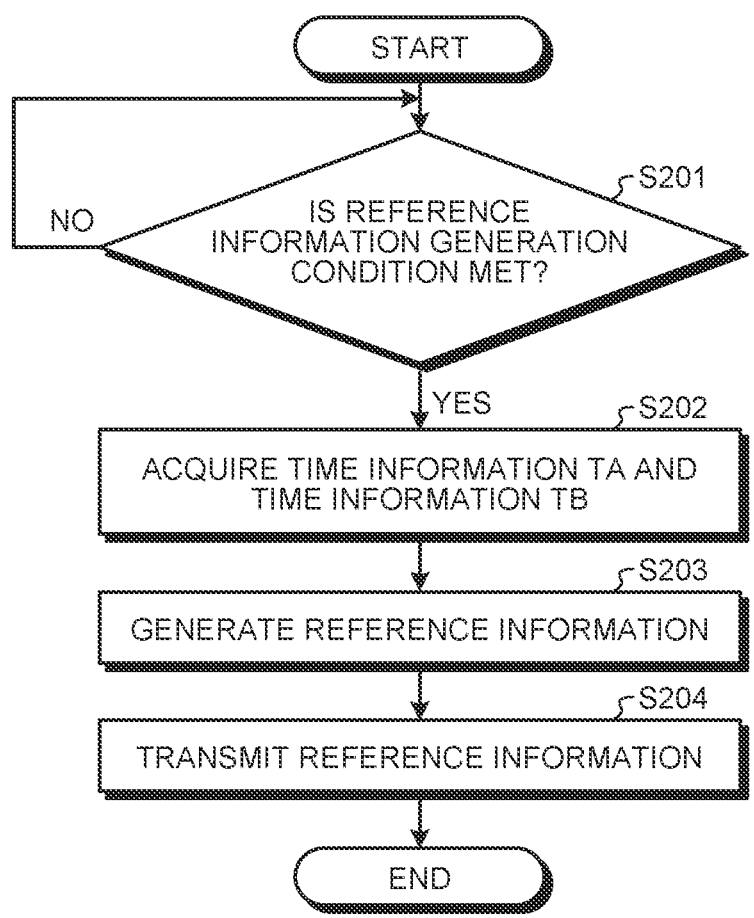
FIG. 4 is a flowchart of a reference information transmission process in the first embodiment.

Next, the details of the reference information transmission process, in which the edge system 100 generates and transmits the reference information, will be described. The reference information transmission process corresponds to the steps S104 and S105 in FIG. 3. FIG. 4 is a flowchart illustrating an example of the reference information transmission process.

The generation module 102 determines whether the condition for generating the reference information is met (step S201). If the condition for generating the reference information is not met (No at the step S201), the process returns to the step S201 and is repeated until the condition is met.

If the condition for generating the reference information is met (Yes at the step S201), the generation module 102 acquires the time information TA from the operating status stored in the storage 121 or the like by the video transmission module 101, and also acquires the time information TB from the internal clock of the edge system 100 (step S202). The generation module 102 generates the reference information in which the acquired time information TA and the acquired time information TB are associated to each other (step S203).

The reference information transmission module 103 transmits the generated reference information to the server 200 (step S204) and ends the reference information transmission process.

First Modification

The number of cameras connected to the single edge system 100 is not limited to one. The edge system 100 may have two or more cameras connected thereto. A first modification describes an information processing system 10B including an edge system 100B to which two cameras 301 and 301B are connected.

Figure 5:
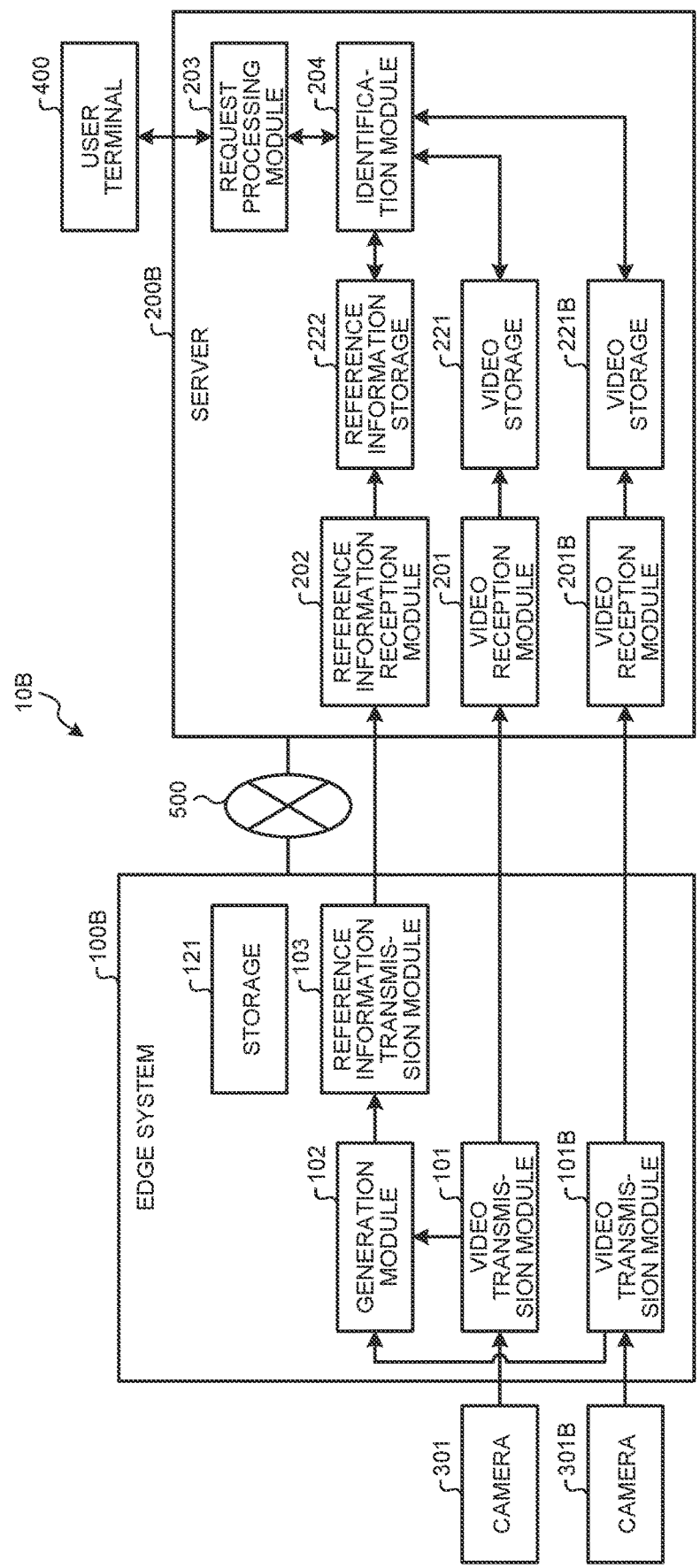
FIG. 5 is a block diagram of an information processing system of a first modification.

FIG. 5 is a block diagram illustrating a configuration example of the information processing system 10B of the first modification. As illustrated in FIG. 5, the information processing system 10B includes the edge system 100B and a server 200B, connected by the network 500.

The present modification differs from the above embodiment in that the camera 301B is further connected to the edge system 100B, a video transmission module 101B is added to the edge system 100B, and a video reception module 201B and a video storage 221B are added to the server 200B. Other components and functions are the same as in FIG. 1, which is the block diagram of the information processing system 10 according to the first embodiment, and are thus denoted by the same reference numerals to omit the description thereof.

As illustrated in FIG. 5, the edge system 100B includes the video transmission modules 101 and 101B (a plurality of the first data transmission modules) that transmit the video stream data captured by the different cameras 301 and 301B, to the server 200B. The video transmission module 101B has the same function as the video transmission module 101, except that it processes and transmits the video stream data received from the camera 301B instead of the camera 301.

The video reception module 201B and the video storage 221B also have the same functions as the video reception module 201 and the video storage 221, except that the target data is replaced by the video stream data received from the camera 301B.

The present modification is applicable to a system configuration that independently manages the video stream data obtained from a plurality of cameras. For example, the present modification can be applied to an information processing system where the camera 301 and the camera 301B are a visible light camera and an infrared camera, respectively. For example, the present modification can be also applied to an information processing system where the edge system 100B is a vehicle, and the camera 301 is a front camera that captures the front of the vehicle and the camera 301B is a rear camera that captures the rear of the vehicle.

FIG. 6 is a diagram illustrating a data structure example of the reference information in the present modification. As illustrated in FIG. 6, the reference information includes the identification information, time information $TA_1$, time information $TA_2$, and the time information TB. The time information $TA_1$ represents the time information corresponding to the video stream data obtained from the camera 301. The time information $TA_2$ represents the time information corresponding to the video stream data obtained from the camera 301B.

By using the reference information as illustrated in FIG. 6, the identification module 204 can identify data having a desired timing with respect to the data stored in both the video storage 221 and the video storage 221B.

In the first modification, the reference information in which the time information pieces of a plurality of video stream data are associated to each other can be generated. Therefore, one of the video stream data corresponding to the video stream data having a desired timing among the other of the video stream data can be more efficiently identified.

For example, when the user checks the video stream data of the rear camera (e.g., the camera 301B) and finds a following vehicle that is driving dangerously, the user requests the video stream data of the front camera (e.g., the camera 301) having the same timing. The identification module 204 identifies the video stream data of the front camera corresponding to this timing from the video storage 221 by referring to the reference information. The request processing module 203 provides the identified video stream data to the user.

Second Modification

A second modification is an example of an information processing system 10C configured to synthesize the video stream data captured by a plurality of cameras and store it in the server.

Figure 7:
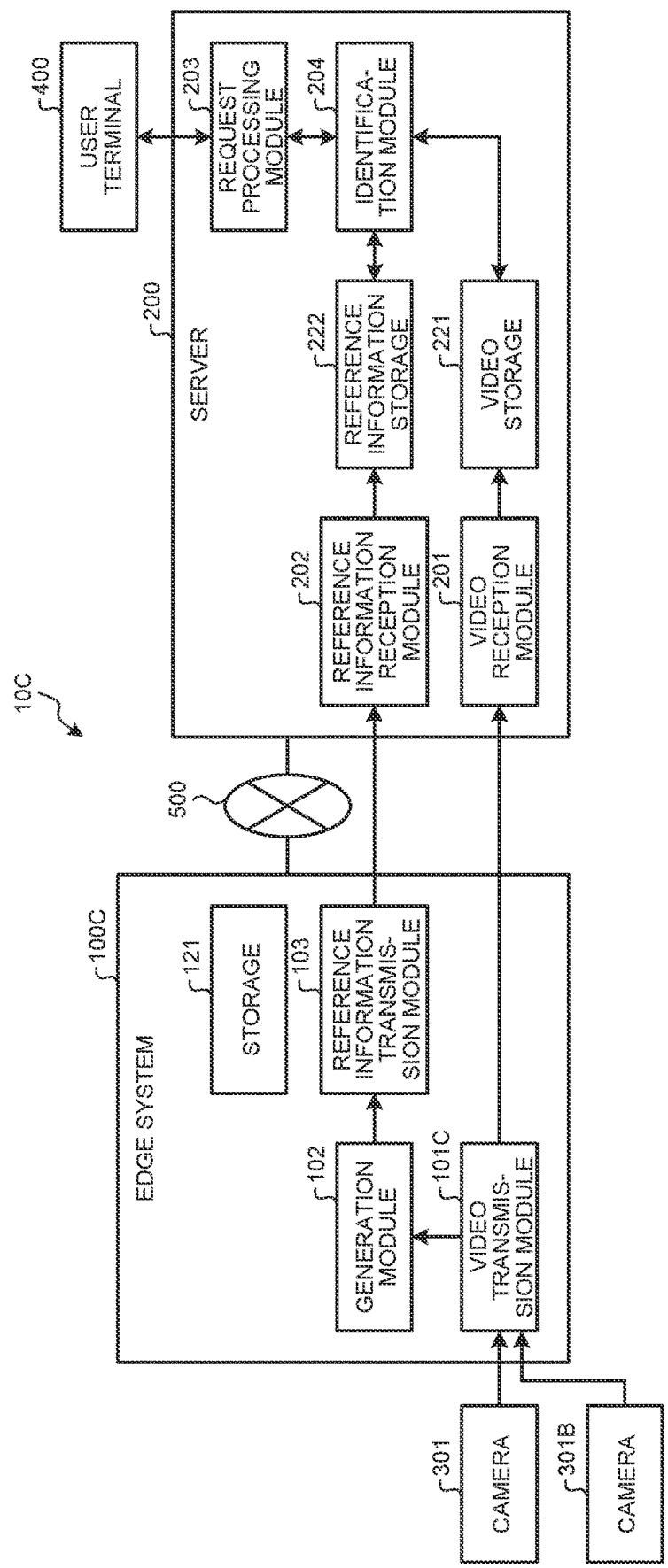
FIG. 7 is a block diagram of an information processing system of a second modification.

FIG. 7 is a block diagram illustrating a configuration example of the information processing system 10C of the second modification. As illustrated in FIG. 7, the information processing system 10C includes an edge system 100C and the server 200, connected by the network 500.

The present modification differs from the above embodiment in that the camera 301B is further connected to the edge system 100C, and in the function of a video transmission module 101C. Other components and functions are the same as in FIG. 1, which is the block diagram of the information processing system 10 according to the first embodiment, and are thus denoted by the same reference numerals to omit the description thereof.

The video transmission module 101C differs from the video transmission module 101 of the above embodiment in that the video transmission module 101 synthesizes the video stream data captured by the cameras 301 and 301B, which are different imaging devices from each other, and transmits the synthesized video stream data to the server 200. As in the first modification, the video transmission module 101B may transmit the video stream data by the camera 301B to the video reception module 201, and the video reception module 201 may synthesize the video stream data.

The present modification can be applied, for example, to an information processing system that transmits video stream data (e.g., a panoramic image) obtained by synthesizing the video stream data from the front and rear cameras.

Third Modification

As described above, the stream data is not limited to the video stream data. For example, when audio stream data is used as the stream data, a microphone, an audio transmission module (another example of the first data transmission module), an audio reception module (another example of the data reception module), and an audio storage (another example of the data storage) may be used instead of the camera 301, the video transmission module 101, the video reception module 201, and the video storage 221.

As another example, the camera 301 may be replaced by a sensor that handles uncompressed waveform data with a sampling rate of several hundred kHz or higher, and the stream data to be handled may be replaced by the waveform data. For the stream data, such as the uncompressed waveform data, where the amount of data per sample is fixed, the time information TA of the stream data may be expressed by the following relative time:

Number of bytes (counted from the beginning)
Number of samples (counted from the beginning)

For example, if no time information TB matches the time information TC, the identification module 204 obtains the time information TB having a smaller difference from the time information TC than other pieces of the time information. The identification module 204 calculates the number of samples equivalent to the difference between the obtained time information TB and the time information TC, based on the sampling rate, the amount of data per sample, and the like. The identification module 204 identifies the stream data corresponding to a time that is shifted by the calculated number of samples from the time information TB, as the stream data corresponding to the time information TC.

As described above, in the first embodiment, the requested stream data is identified using the reference information transmitted from the edge system independently of the stream data transmission. This allows for more efficient identification of the desired stream data.

Fourth Modification

Figure 8:
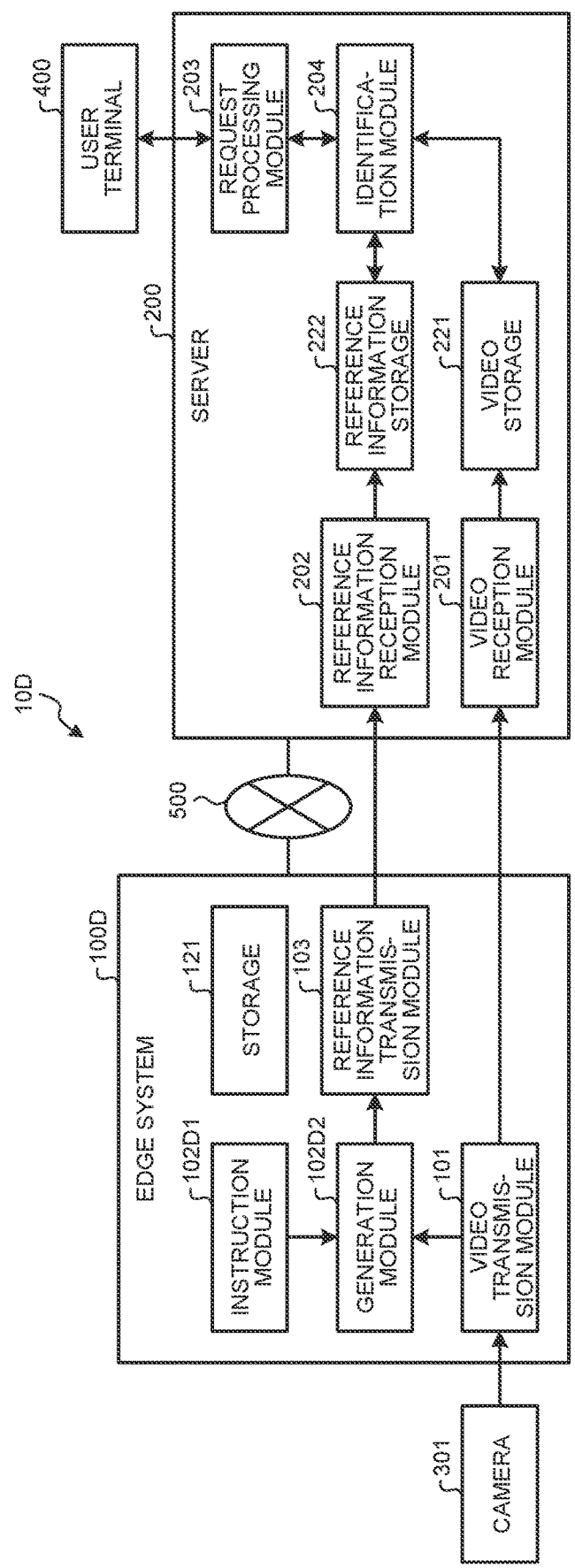
FIG. 8 is a block diagram of an information processing system of a fourth modification.

The function of the generation module 102 may be divided into a function (instruction module) to instruct the generation of the reference information when the generation condition is met, and a function to generate the reference information in response to the instruction. FIG. 8 is a block diagram illustrating a configuration example of an information processing system 10D of a fourth modification configured as described above. As illustrated in FIG. 8, the information processing system 10D includes an edge system 100D and the server 200, connected by the network 500.

The present modification differs from the above embodiment in that the edge system 100D further includes an instruction module 102D1 and in the function of a generation module 102D2. Other components and functions are the same as in FIG. 1, which is the block diagram of the information processing system 10 according to the first embodiment, and are thus denoted by the same reference numerals to omit the description thereof.

The instruction module 102D1 determines whether the generation condition is met and, if so, instructs the generation module 102D2 to generate the reference information.

The generation module 102D2 differs from the generation module 102 of the above embodiment in that the generation module 102D2 generates the reference information in response to the instruction from the instruction module 102D1.

Figure 9:
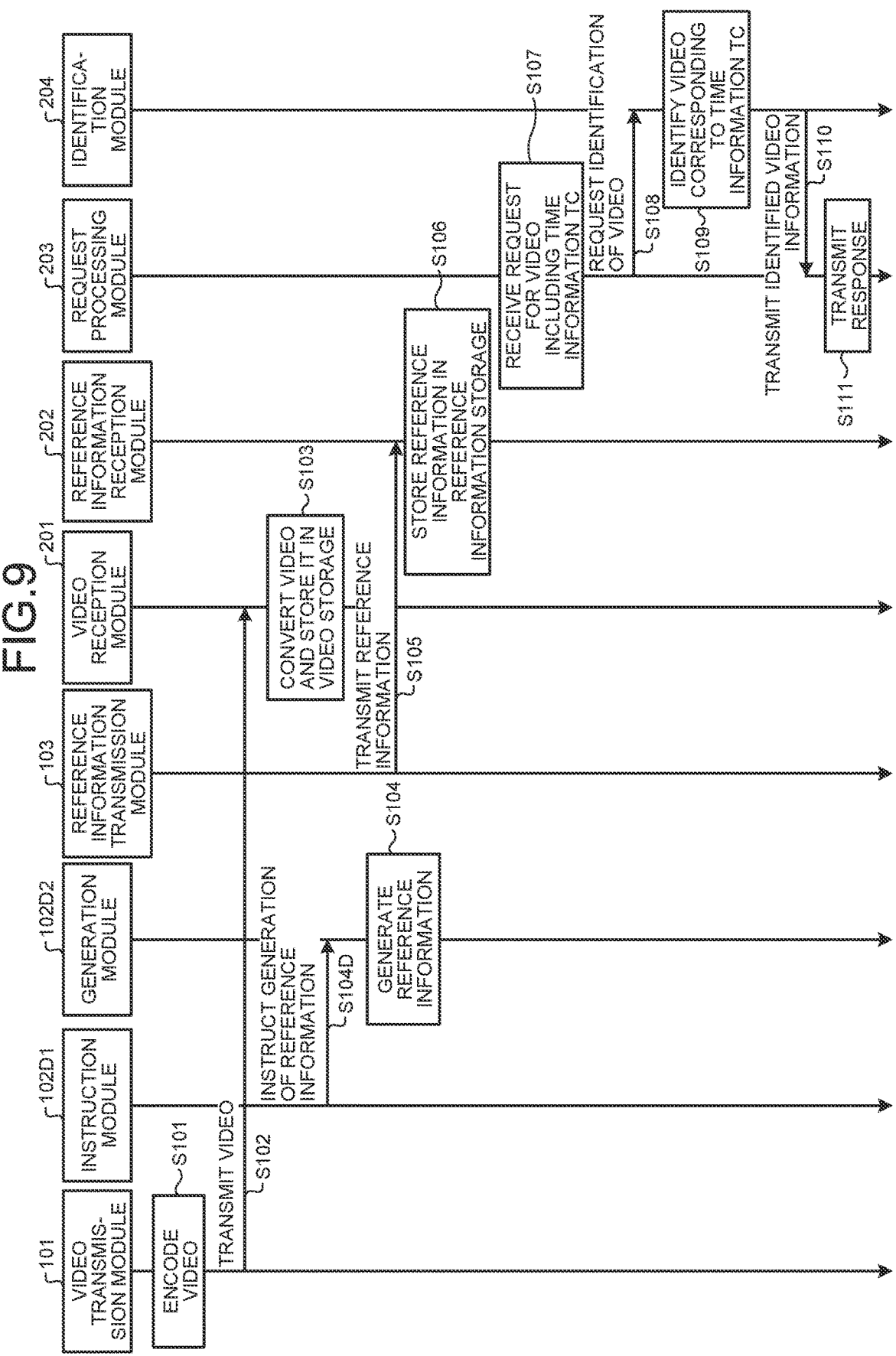
FIG. 9 is a sequence diagram of information processing in the fourth modification.

FIG. 9 is a sequence diagram illustrating an example of the information processing in the fourth modification. FIG. 9 differs from FIG. 3, which illustrates the information processing in the first embodiment, in that step S104D is added before the step S104.

The instruction module 102D1 determines whether the generation condition is met and, if so, instructs the generation module 102D2 to generate the reference information (the step S104D)). The generation module 102D2 generates the reference information upon receiving the instruction from the instruction module 102D1 (the step S104). The steps S101 through S103, and the steps from the step S105 are the same as in FIG. 3.

Figure 10:
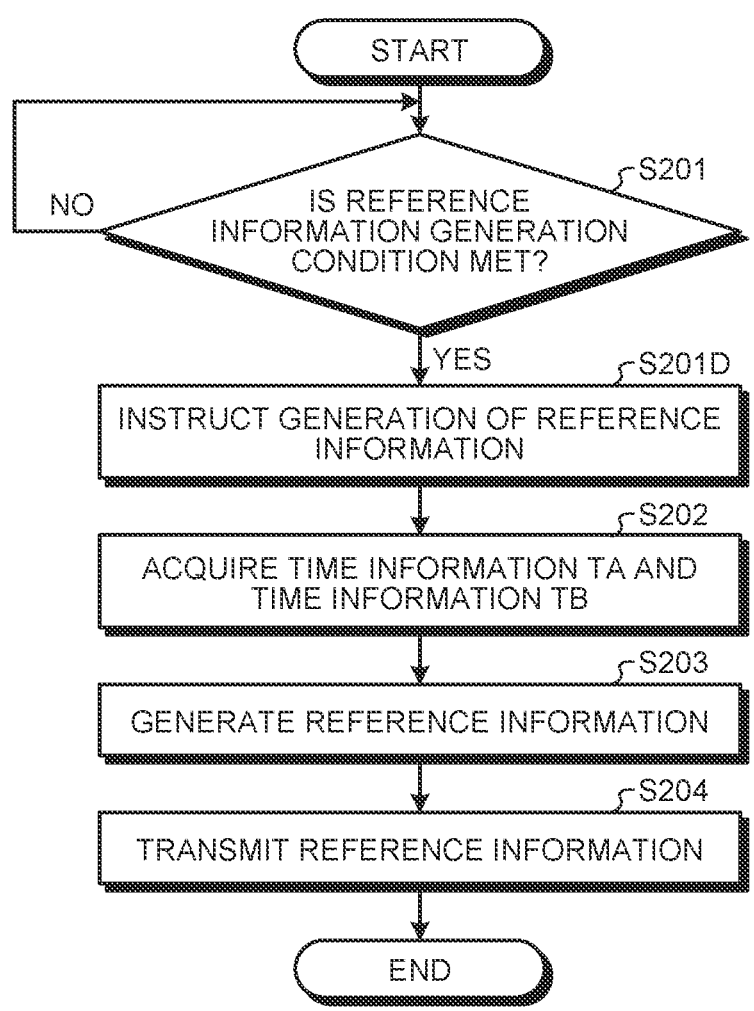
FIG. 10 is a flowchart of a reference information transmission process in the fourth modification.

FIG. 10 is a flowchart illustrating an example of the reference information transmission process in the fourth modification. FIG. 10 differs from FIG. 4, which illustrates the reference information transmission process in the first embodiment, in that step S201D is added before the step S202.

The instruction module 102D1 determines whether the condition for generating the reference information is met (the step S201). If the condition for generating the reference information is not met (No at the step S201), the process returns to the step S201 and is repeated until the condition is met.

If the condition for generating the reference information is met (Yes at the step S201), the instruction module 102D1 instructs the generation module 102D2 to generate the reference information (the step S201D). The steps from the step S202 are the same as in FIG. 4.

Second Embodiment

An information processing system according to a second embodiment has an additional function to collect stream data that differs from the video stream data. The information processing system of the second embodiment also generates the reference information by employing a timing when the added stream data is acquired (generated, updated) as the generation condition.

Figure 11:
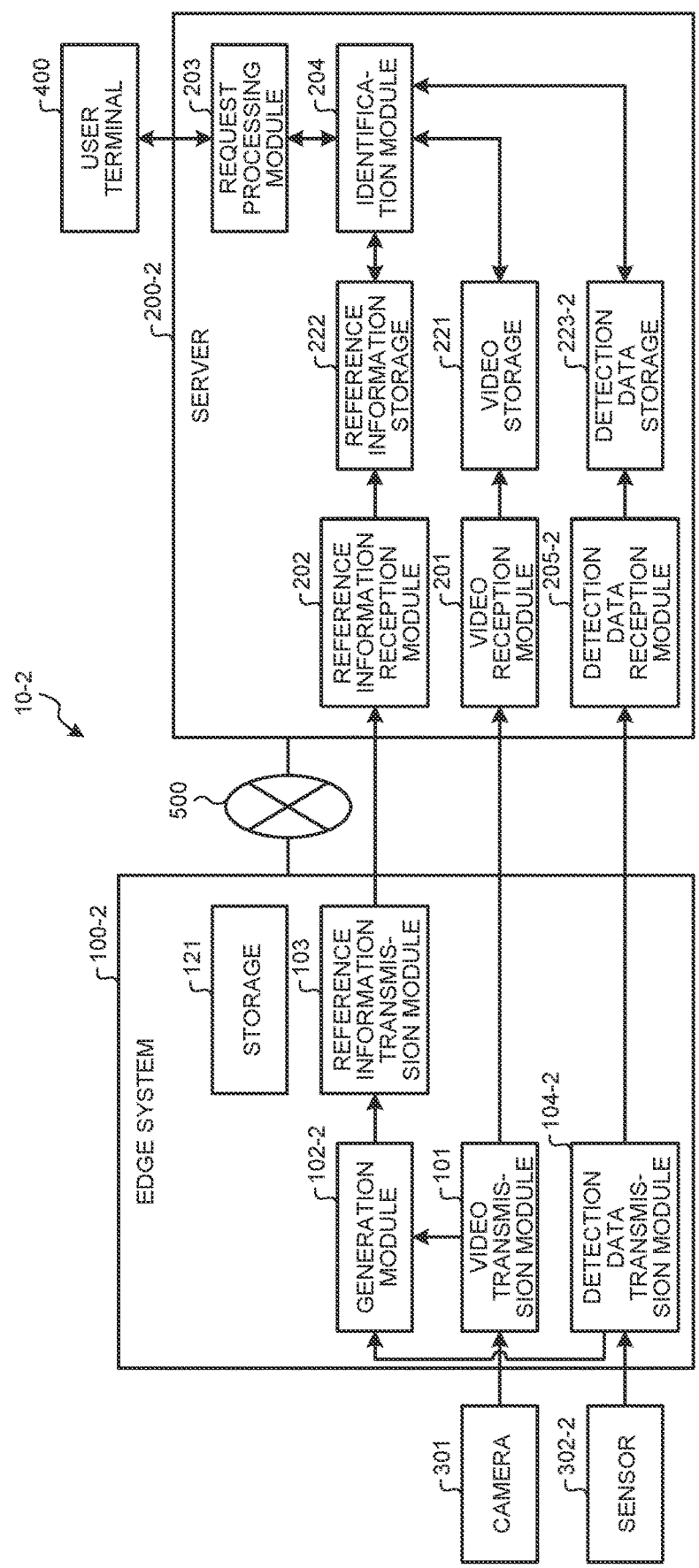
FIG. 11 is a block diagram of an information processing system according to a second embodiment.

FIG. 11 is a block diagram illustrating a configuration example of an information processing system 10-2 according to the second embodiment. As illustrated in FIG. 11, the information processing system 10-2 includes an edge system 100-2 and a server 200-2, connected by the network 500.

The second embodiment differs from the above embodiment in that a sensor 302-2 is further connected to the edge system 100-2, a detection data transmission module 104-2 (an example of a second data transmission module) is added to the edge system 100-2, the function of a generation module 102-2, and a detection data reception module 205-2 and a detection data storage 223-2 are added to the server 200-2. Other components and functions are the same as in FIG. 1, which is the block diagram of the information processing system 10 according to the first embodiment, and are thus denoted by the same reference numerals to omit the description thereof.

The sensor 302-2 is a sensor that acquires different detection data from the camera 301. The sensor 302-2 can be any device. A sensor of the type described above (e.g., the temperature sensor, the humidity sensor) or a different camera from the camera 301 may be employed.

In the present embodiment, the sensor 302-2 acquires detection data (an example of second stream data) every time a certain period of time elapses or in response to a control instruction.

The detection data transmission module 104-2 transmits the acquired detection data to the server 200-2. For example, when receiving the detection data from the sensor 302-2, the detection data transmission module 104-2 transmits a time information request to the generation module 102-2 in order to express time information indicating the receipt timing by the time information TB having a different generation source from the time information TA of the video stream data. If the time information TB is obtained from the device's internal clock, the generation module 102-2 acquires the time information at the time when the time information request is received by using the same clock, and returns the acquired time information to the detection data transmission module 104-2 as a response to the time information request. The detection data transmission module 104-2 transmits stream data (time-series data) including the detection data and the time information to the server 200-2 (the detection data reception module 205-2).

The generation module 102-2 generates the reference information by employing the timing of receipt of the time information request from the detection data transmission module 104-2 as the generation condition. The timing when the time information request is received from the detection data transmission module 104-2 can be rephrased as the timing when the sensor 302-2 acquires the detection data.

As described above, the sensor 302-2 acquires the detection data every time a certain period of time elapses (e.g., every second) or when receiving a control instruction. Therefore, the generation module 102-2 can generate the reference information similarly to the generation module 102 of the first embodiment, by employing the elapse of a certain period of time or the receipt of a control instruction as the generation condition.

Although an example with one sensor 302-2 is illustrated in FIG. 11, a plurality of the sensors 302-2 may be provided. In this case, the generation module 102-2 generates the reference information by employing as the generation condition the timing of receiving the time information request from the detection data transmission module 104-2 corresponding to any one of the sensors 302-2.

The reference information in the present embodiment is information in which the time information TB (e.g., an absolute time) when the detection data is registered as the time-series data, and the time information TA (e.g., a frame number) of the video stream data having the same timing as this time information are associated to each other. Such reference information enables chronological association between the time-series data (detection data) and the video stream data. The video stream data corresponding to the specified detection data (e.g., detection data with fluctuations) can be thereby more efficiently identified.

The detection data reception module 205-2 of the server 200-2 receives the detection data transmitted from the edge system 100-2 (the detection data transmission module 104-2). The detection data reception module 205-2 may perform pre-processing, such as converting the detection data to a format to be stored in the detection data storage 223-2. The detection data storage 223-2 stores the received detection data.

Figure 12:
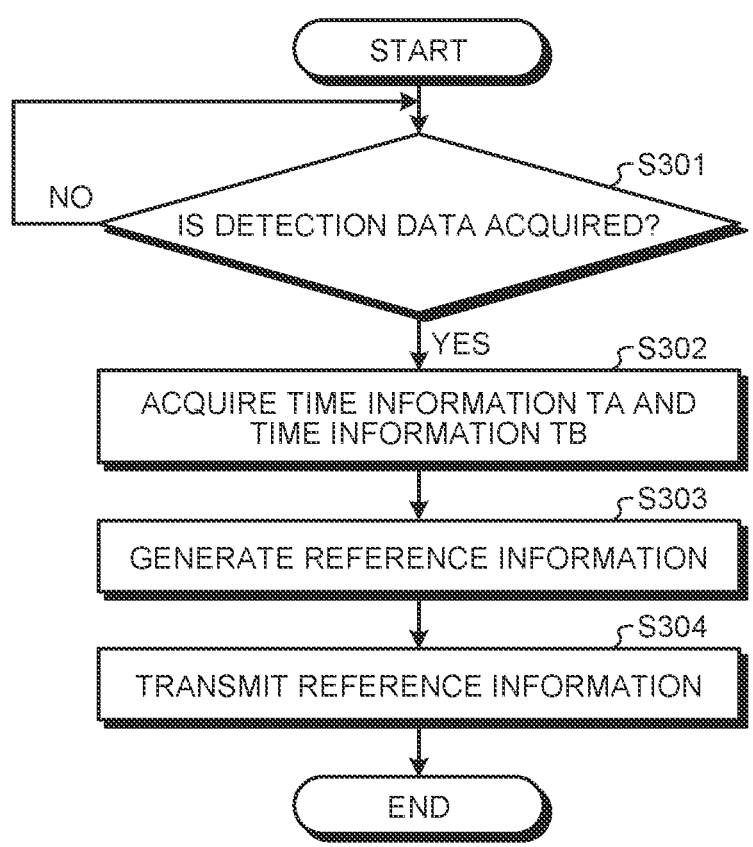
FIG. 12 is a flowchart of a reference information transmission process in the second embodiment.

Next, the reference information transmission process according to the second embodiment will be described using FIG. 12. FIG. 12 is a flowchart illustrating an example of the reference information transmission process in the second embodiment.

The generation module 102-2 determines whether the detection data has been acquired by the sensor 302-2 (step S301). The generation module 102-2 determines that the detection data has been acquired, for example, when receiving the time information request from the detection data transmission module 104-2. If no detection data has been acquired (No at the step S301), the process is repeated until the detection data is acquired. If the detection data has been acquired (Yes at the step S301), the generation module 102-2 acquires the time information TA and the time information TB (step S302).

Steps S303 and S304 are similar to the steps S203 and S204 (FIG. 4) in the information processing system 10 according to the first embodiment, so that the description thereof is omitted.

As described above, in the second embodiment, the reference information in which the time information pieces of a plurality of stream data (such as the video stream data and the detection data by the sensor) are associated to each other can be generated. Therefore, one of the stream data corresponding to the stream data having a desired timing among the other of the stream data can be more efficiently identified.

For example, if the two stream data including the video stream data and the detection data are available, the data can be identified by the following two patterns:

(Pattern P1) To provide the video stream data to the user: For example, if the user checks the detection data and finds an abnormal value, the user requests the video stream data having the same timing as the detection data with the abnormal value. The identification module 204 identifies the video stream data corresponding to this timing from the video storage 221 by referring to the reference information. The request processing module 203 provides the identified video stream data to the user.

(Pattern P2) To provide the detection data to the user: For example, if the user watches a video and is concerned about something in the video at a particular timing, the user requests the detection data having the same timing. The identification module 204 identifies the detection data corresponding to this timing from the detection data storage 223-2 by referring to the reference information. The request processing module 203 provides the identified detection data to the user. The pattern P2 is exemplified by a case where the user notices that smoke is rising while watching a video, and requests the target detection data having this timing.

First Modification of Second Embodiment

The time information used for the reference information may use a duplicate value. FIG. 13 is a diagram illustrating a data structure example of the reference information of a first modification in the second embodiment. For example, the camera 301 transmits 2000 frames of video per minute, the sensor 302-2 performs sensing and detection data transmission once per minute, and the generation module 102-2 generates reference information every 30 seconds. At this time, as illustrated in FIG. 13, there may be two pieces of reference information in which the time information TB has a value of "20211201 12:00:00". This is because the generation module 102-2 generates the reference information at the timing of "20211201 12:00:30", but the sensor 302-2 performs no sensing at the timing of "20211201 12:00:30". Thus, the value of the time information TB is "20211201 12:00:00".

If the reference information with the duplicate time information is stored in the reference information storage 222 and the user specifies a time corresponding to the duplicate time information as the time information TC, the identification module 204 performs the following identification process, for example. The following identification process is merely an example, and any other process may be employed.

(M1) Among the duplicate time information (e.g., the time information TB), only one identification result that corresponds to a time when the other time information (e.g., the time information TA) has the oldest value (earliest time) is returned.

(M2) Among the duplicate time information (e.g., the time information TB), only one identification result that corresponds to a time when the other time information (e.g., the time information TA) has the latest value is returned.

(M3) A plurality of identification results corresponding to all the duplicate time information (e.g., the time information TB) are returned.

Second Modification of Second Embodiment

FIG. 14 is a diagram illustrating a data structure example of the reference information of a second modification in the second embodiment. As illustrated in FIG. 14, the reference information includes the identification information, the time information $TA_1$, the time information $TA_2$, and the time information TB. The time information $TA_1$ represents the time information corresponding to the video stream data obtained from the camera 301. The time information $TA_2$ represents the time information when the sensor 302-2 acquires the detection data. The time information $TA_2$ is a value obtained from an internal or inherent clock of the sensor 302-2. The time information TB represents the clock time of the edge system.

FIG. 14 illustrates a reference information example in a case where the camera 301 transmits 2000 frames of video per minute, the sensor 302-2 performs sensing and detection data transmission once per minute, and the generation module 102-2 generates reference information every 30 seconds.

As illustrated in FIG. 14, since the generation module 102-2 generates the reference information every 30 seconds, values advancing by 30 seconds are stored in the time information TB. At this time, values advancing by 1000 (since there are 2000 frames per minute) are stored in the time information $TA_1$. On the other hand, because the time information $TA_2$ has not been updated as of the value of "20211201 12:00:30" in the time information TB, the time information $TA_2$ has a value of "20211201 12:00:00" (which is a time when the previous update was made). As described above, if the time information of the camera 301 and the sensor 302-2 has not been updated at the time of generating the reference information, the value of the previous time information may be duplicated and used as the reference information.

Third Embodiment

In a third embodiment, the edge system is composed of a plurality of physical pieces of hardware (devices). While the following describes an example where the edge system of the second embodiment is composed of a plurality of pieces of hardware, the same procedure can be applied to a case where the edge system of the first embodiment is composed of a plurality of pieces of hardware.

Figure 15:
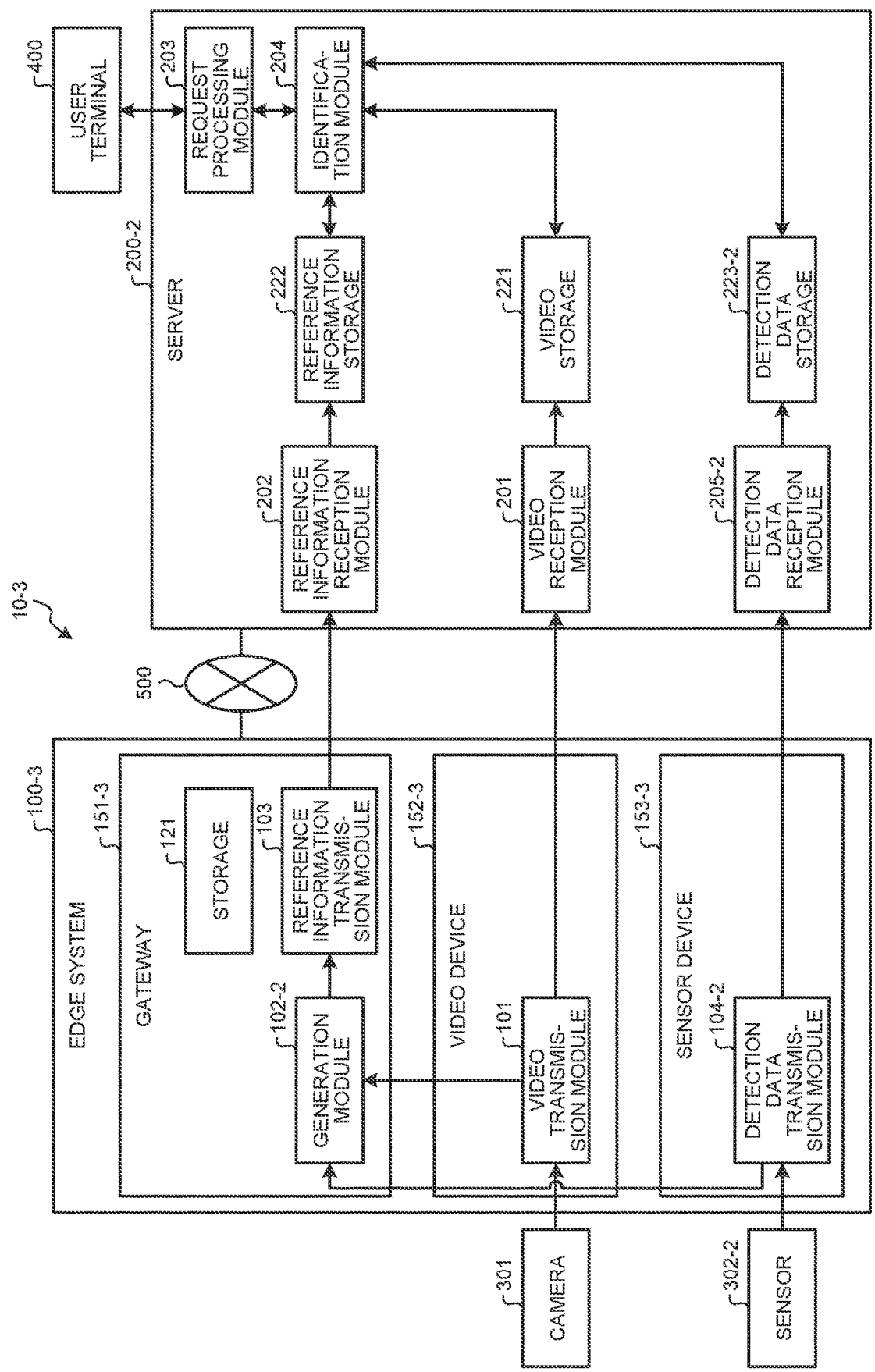
FIG. 15 is a block diagram of an information processing system according to a third embodiment.

FIG. 15 is a block diagram illustrating a configuration example of an information processing system 10-3 according to the third embodiment. As illustrated in FIG. 15, the information processing system 10-3 includes an edge system 100-3 and the server 200-2, connected by the network 500.

In the third embodiment, the edge system 100-3 is composed of three devices: a gateway 151-3 (an example of a second device), a video device 152-3 (an example of a first device), and a sensor device 153-3. Other components and functions are the same as in FIG. 1, which is the block diagram of the information processing system 10 according to the first embodiment, and are thus denoted by the same reference numerals to omit the description thereof.

The gateway 151-3 includes the generation module 102-2, the reference information transmission module 103, and the storage 121. The video device 152-3 includes the video transmission module 101. The sensor device 153-3 includes the detection data transmission module 104-2. As described above, in this embodiment, the units of the edge system 100-2 of the second embodiment are divided into the devices.

The gateway 151-3 has a function to aggregate the reference information of the devices (the video device 152-3, the sensor device 153-3) that individually acquire the stream data.

The gateway 151-3, the video device 152-3, and the sensor device 153-3 are mutually connected via, for example, the network 500. A transmission delay in communication among the gateway 151-3, the video device 152-3, and the sensor device 153-3 is a delay time small enough to be negligible as compared to a sampling period in the video device 152-3 and the sensor device 153-3.

The video device 152-3 and the camera 301 are connected via a control bus or the like. The sensor device 153-3 and the sensor 302-2 are connected via a control bus or the like.

The video transmission module 101 of the video device 152-3 receives the video stream data from the camera 301 and transmits the video stream data to the server 200-2. The video device 152-3 does not have to be directly connected to the server 200-2 via the network 500 or the like. In that case, the video transmission module 101 transmits the video stream data to the server 200-2 (the video reception module 201) through the gateway 151-3.

The detection data transmission module 104-2 of the sensor device 153-3 receives the detection data from the sensor 302-2 and transmits the detection data to the server 200-2 as the time-series data combined with the time information. Upon receiving the detection data, the detection data transmission module 104-2 transmits the time information request to the generation module 102-2 to acquire the time information TB. The detection data transmission module 104-2 may acquire the time information TB from an internal clock or the like of the sensor device 153-3.

The sensor device 153-3 does not have to be directly connected to the server 200-2 via the network 500 or the like. In that case, the detection data transmission module 104-2 transmits the time-series data to the server 200-2 (the detection data reception module 205-2) through the gateway 151-3.

The method of dividing the units of the edge system 100-3 into the devices is not limited to the method illustrated in FIG. 15. For example, the respective units may be divided so that one physical device achieves two of the gateway 151-3, the video device 152-3, and the sensor device 153-3.

As described above, in the third embodiment, the same procedure as in the above embodiment can be applied to the case where the edge system is physically composed of the devices.

As explained above, the first through third embodiments allow for more efficient identification of the data having a desired timing.

Figure 16:
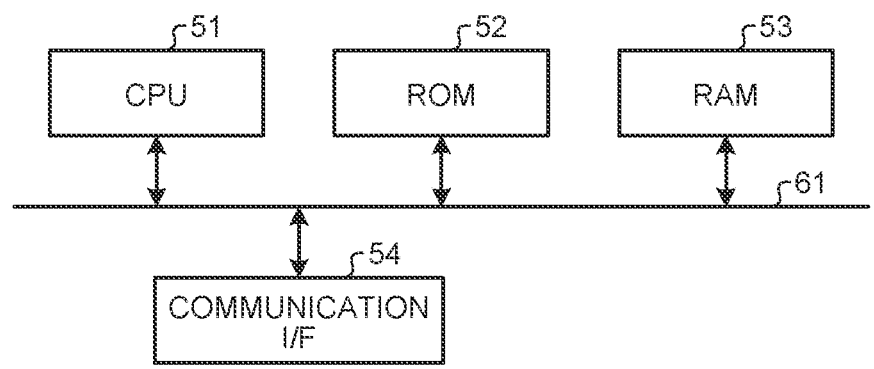
FIG. 16 is a hardware configuration diagram of a device according to the first through third embodiments.

Next, a hardware configuration of the device (the edge system, the server, the gateway, the video device, and the sensor device) according to the first through third embodiments will be described using FIG. 16. FIG. 16 is a diagram illustrating a hardware configuration example of the device according to the first through third embodiments.

The device according to the first through third embodiments includes a controller such as a CPU 51, a storage such as a read only memory (ROM) 52 and a RAM 53, a communication I/F 54 that is connected to a network for communication, and a bus 61 that connects the respective units.

The computer programs executed by the device according to the first through third embodiments are provided by being previously incorporated in the ROM 52 or the like.

The computer programs executed by the device according to the first through third embodiments may be provided as a computer program product by being recorded on a computer-readable recording medium, such as a compact disc read only memory (CD-ROM), a flexible disk (FD), a compact disc recordable (CD-R), and a digital versatile disc (DVD), as a file in an installable or executable format.

Furthermore, the computer programs executed by the device according to the first through third embodiments may be stored in a computer connected to a network such as the Internet, and provided by being downloaded via the network. The computer programs executed by the device according to the first through third embodiments may also be provided or distributed via a network such as the Internet.

The computer programs executed by the device according to the first through third embodiments can cause a computer to function as the respective units of the server device described above. In the computer, the CPU 51 can read the computer programs from a computer-readable storage medium onto its main storage and execute the computer programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising a server device and one or more edge systems,
   each of the edge systems including:
   a first memory; and
   one or more first processors coupled to the first memory and configured to:
   transmit a plurality of first stream data to which first time information is associated, to the server device;
   generate reference information in which second time information having a different generation source from the first time information and the first time information corresponding to the first stream data selected as a reference from among the plurality of first stream data are associated to each other; and transmit the reference information to the server device, and the server device including:

a second memory; and one or more second processors coupled to the second memory and configured to:
receive the plurality of first stream data from the edge systems and store the plurality of first stream data in the second memory;
receive the reference information from the edge systems and store the reference information in the second memory;
receive an acquisition request including third time information expressed in a same format as the second time information, and requesting acquisition of the first stream data corresponding to the third time information; and
identify the first stream data corresponding to the third time information included in the acquisition request based on the reference information.

2. The system according to claim 1, wherein the one or more first processors are configured to generate the reference information every time a certain period of time elapses or when a control instruction is received.

3. The system according to claim 1, wherein the one or more first processors are configured to:
transmit a plurality of second stream data acquired every time a certain period of time elapses or when a control instruction is received, to the server device; and
generate the reference information when the second stream data is newly acquired.

4. The system according to claim 1, wherein the one or more second processors are configured to obtain the first time information that is associated to the second time information matching the third time information or the second time information having a smaller difference from the third time information than other pieces of the second time information, and identify the first stream data corresponding to the obtained first time information.

5. The system according to claim 1, wherein the one or more second processors are configured to obtain the first time information that is associated to the second time information having a smaller difference from the third time information than other pieces of the second time information, and identify the first stream data corresponding to a time that is shifted by an amount equivalent to the difference from the obtained first time information.

6. The system according to claim 1, wherein the one or more second processors are configured to transmit information indicating the identified first stream data to a transmission source of the acquisition request.

7. The system according to claim 1, wherein the first stream data is video stream data, the first time information is information identifying a frame of the video stream data, and the second time information and the third time information are information expressed based on a prescribed time.

8. The system according to claim 1, wherein the one or more first processors are configured to individually transmit the first stream data detected by different detection devices to the server device.

9. The system according to claim 1, wherein the one or more first processors are configured to synthesize the first stream data detected by different detection devices and transmit the synthesized first stream data to the server device.

10. The system according to claim 1, wherein the one or more first processors includes:
a processor configured to transmit the plurality of first stream data; and
a processor configured to generate the reference information and transmit the reference information.

11. The system according to claim 1, wherein the first time information and the second time information are expressed in different formats.

12. A server device comprising:

a memory; and one or more processors coupled to the memory and configured to:
receive a plurality of first stream data to which first time information is associated from one or more edge systems, and store the plurality of first stream data in the memory;
receive reference information in which second time information having a different generation source from the first time information and the first time information corresponding to the first stream data selected as a reference from among the plurality of first stream data are associated to each other, from the edge systems, and store the reference information in the memory;
receive an acquisition request including third time information expressed in a same format as the second time information, and requesting acquisition of the first stream data corresponding to the third time information; and
identify the first stream data corresponding to the third time information included in the acquisition request based on the reference information.

13. A computer program product comprising a non-transitory computer-readable medium including programmed instructions, the instructions causing a computer to execute:
receiving a plurality of first stream data to which first time information is associated from one or more edge systems, and storing the plurality of first stream data in a memory;
receiving reference information in which second time information having a different generation source from the first time information and the first time information corresponding to the first stream data selected as a reference from among the plurality of first stream data are associated to each other, from the edge systems, and storing the reference information in the memory;
receiving an acquisition request including third time information expressed in a same format as the second time information, and requesting acquisition of the first stream data corresponding to the third time information; and
identifying the first stream data corresponding to the third time information included in the acquisition request based on the reference information.

* * * * *